(12) United States Patent
Ernst

(10) Patent No.: US 6,701,027 B1
(45) Date of Patent: Mar. 2, 2004

(54) DEVICE FOR SEPARATING LARGE IMAGES CAPTURED BY DATA ACQUISITION

(75) Inventor: Hartmut Ernst, Rosenheim (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/367,774

(22) PCT Filed: Nov. 9, 1998

(86) PCT No.: PCT/EP98/07134

§ 371 (c)(1),
(2), (4) Date: Mar. 27, 2000

(87) PCT Pub. No.: WO99/33025

PCT Pub. Date: Jul. 1, 1999

(30) Foreign Application Priority Data

Dec. 18, 1997 (DE) .......................................... 197 56 525

(51) Int. Cl.[7] .................................................. G06K 9/40
(52) U.S. Cl. ........................................ 382/275; 382/282
(58) Field of Search ................................ 382/260–275, 382/209–211, 282–284

(56) References Cited

U.S. PATENT DOCUMENTS

| 4,890,314 A | 12/1989 | Judd et al. ..................... 379/53 |
| 4,949,166 A | * 8/1990 | Isnardi ........................ 348/493 |
| 5,502,509 A | * 3/1996 | Kurashita et al. ........... 348/669 |
| 5,675,424 A | 10/1997 | Park ............................ 358/426 |
| 5,701,160 A | 12/1997 | Kimura et al. .............. 348/413 |
| 6,385,287 B1 | * 5/2002 | Dorner ......................... 378/65 |
| 2002/0175683 A1 | * 11/2002 | Mertelmeier et al. ....... 324/314 |

FOREIGN PATENT DOCUMENTS

| JP | 08 037622 | 2/1996 | |
| WO | WO 9933025 A1 | * 7/1999 | ........... G06T/11/60 |

* cited by examiner

*Primary Examiner*—Thomas D. Lee
*Assistant Examiner*—Stephen Brinich
(74) *Attorney, Agent, or Firm*—Kenyon & Kenyon

(57) ABSTRACT

A device is provided for separating images captured by data acquisition into multiple partial images in a separator stage and/or for recombining partial images in a combiner stage. Partial-data buffers (e.g., FIFOs) are provided for the partial images in the separator stage and/or in the combiner stage. The partial-image data buffered in the partial-data buffers also includes redundantly buffered information about at least one adjacent partial image so that, when recombining the partial images, the artifacts produced by filtering the corresponding partial images, which is needed for recombination, lie outside the partial-image data areas needed for recombining the partial images into an overall image.

18 Claims, 4 Drawing Sheets

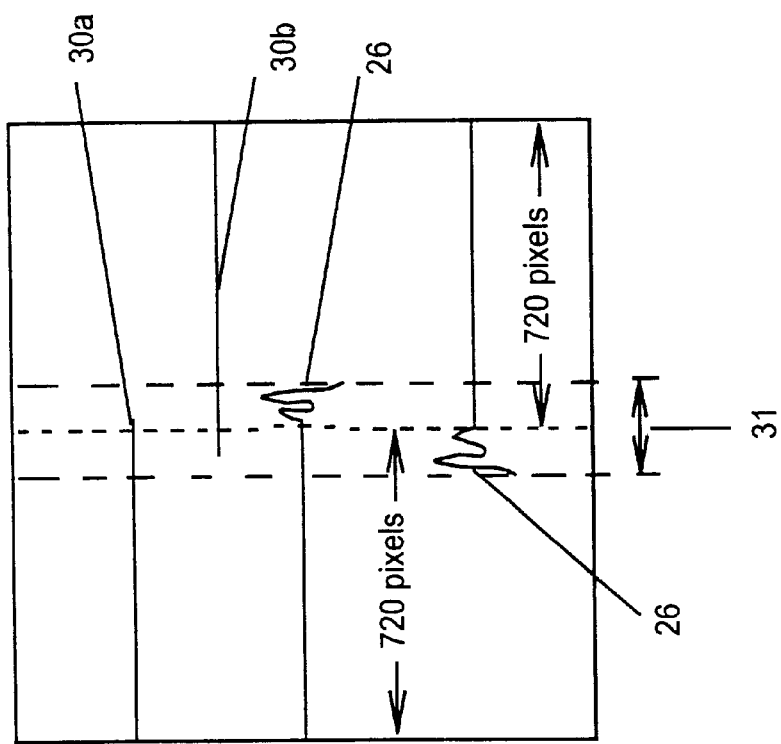
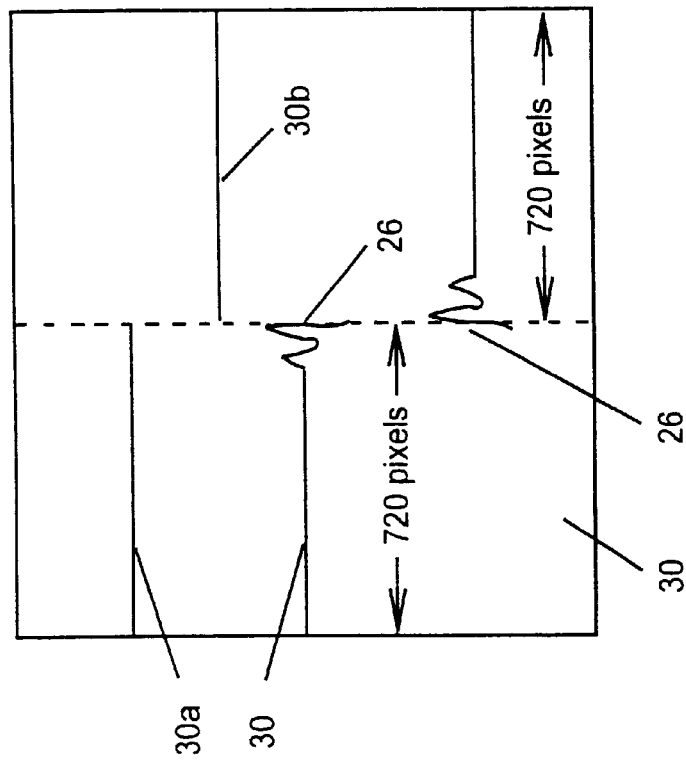
Fig. 3a
Fig. 3b

DEVICE FOR SEPARATING LARGE IMAGES CAPTURED BY DATA ACQUISITION

FIELD OF THE INVENTION

The present invention relates to a device for separating large images captured by data acquisition into multiple sub-images and/or for combining them into larger images.

BACKGROUND INFORMATION

A Numerous applications currently require ever higher signal processing speeds. In particular, high-speed signal processing of very large video images as well as the transmission and storage of such images are proving to be problematic. High-resolution video images of this type can include HDTV images, scanned images, medical images, satellite images, etc. High-speed and, in particular, digital storage systems, such as HDTV recorders, which are used to store high-resolution video images or image sequences, are extremely expensive so that many applications are rejected because of the price.

In addition, the demands placed on the necessary bandwidths are often difficult to meet when processing high-resolution video images in real time, i.e., keeping pace with the desired frame rate. This is true, for example, in the case of scaling, filtering, and data compression.

To solve the problems described above, it is possible to digitize high resolution images and separate them into a number of sub-images. However, it has been shown that separating the images geometrically produces a significant decrease in quality in the area at the edges of the sub-images.

SUMMARY OF THE INVENTION

A The object of the present invention is to provide a method as well as a device which can be used to separate high-resolution images into sub-images using a separator and/or to combine corresponding sub-images into a high-resolution image using a combiner, at the same time maintaining a high to maximum image quality, i.e., in particular without any loss in quality.

A significant improvement in image quality can be achieved using a comparatively simple arrangement.

Quite surprisingly, a significant improvement in image quality can be achieved in the applications under discussion using comparatively simple means.

According to the present invention, it has been shown that artifacts are produced when separating and processing image data into sub-image data and when recombining sub-images to create an overall image. These artifacts occur when filtering the image data, which is usually necessary.

According to the present invention, the video data is now separated in a way that shifts the artifacts influencing image quality out of the critical data area so that this image data negatively affected by artifacts can be omitted when recombining the data to form an overall image, i.e., the negatively affected image data can no longer disturb the image following recombination.

In another embodiment of the present invention, the sub-images can be shifted when they are combined, thus counteracting the formation of artifacts and, in particular, thereby producing certain intentional image effects. This can be done, in particular, to adapt the images to different displays.

According to another embodiment of the present invention, a standard conversion operation is carried out at the same time that the sub-images are combined into a high-resolution image, allowing the timing and format of the output image to deviate from the timing and format of the input image.

It is possible, according to the present invention, to analogously set a delay factor during the band-limiting filtering step. In the case of YUV (4:2:2) representation processing, this makes it possible to set the differences between the delay times on the Y and UV channels so that they correspond to exactly one multiple of the clock frequency and so that they can be equalized digitally.

The present invention can be used for HDTV images as well as for computer graphics or other high-reasolution standards.

BRIEF DESCRIPTION OF THE DRAWINGS

FIG. 3a shows an exemplary schematic representation of a data separation procedure, for example of data in one upper right half-image or one lower right half-image without applying a procedure according to the present invention;

FIG. 3b shows an exemplary schematic representation of the data separation procedure, for example of data in one upper left half image or one lower left half-image after applying the procedure according to the present invention.

DETAILED DESCRIPTION

Figure 1:
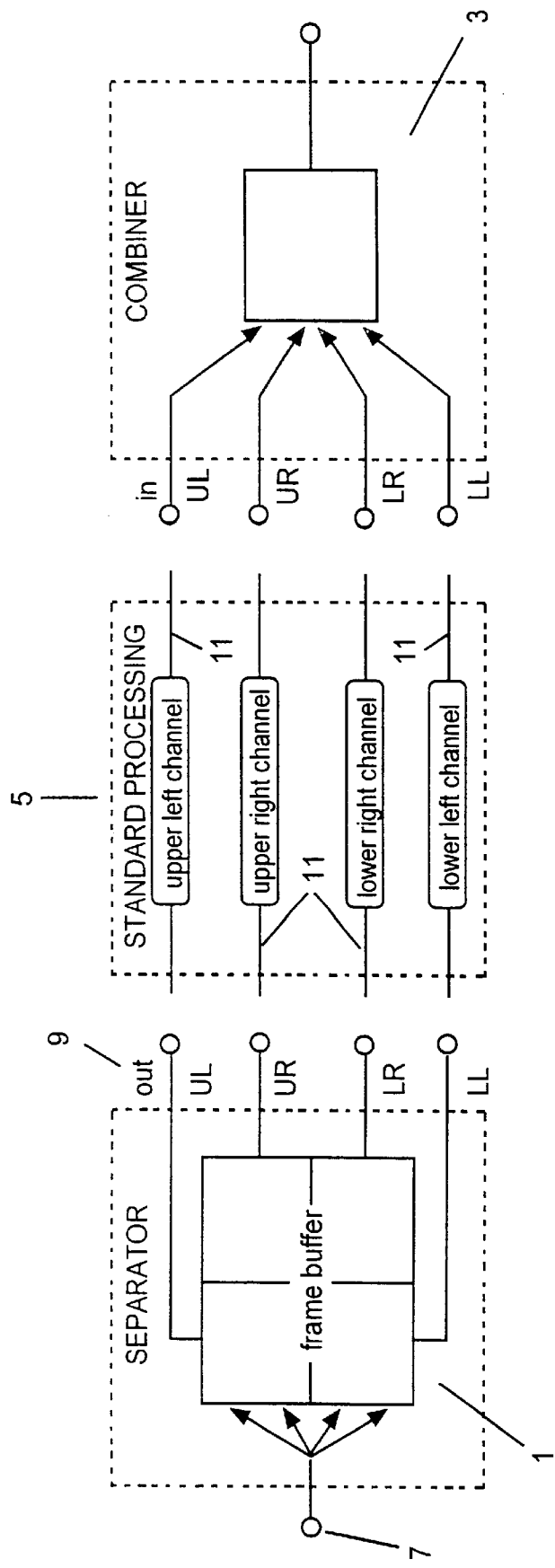
FIG. 1 shows an exemplary schematic diagram of a system according to the present invention.

FIG. 1 shows an overview of a layout of a device according to the present invention.

As shown in FIG. 1, the device for separating large video images into multiple sub-images, and for combining them into large images, includes a separator stage 1, a combiner stage 3, and a data processing stage 5 located between them.

The image data to be separated, and thus to be divided into smaller image units, is supplied to separator stage 1 via an input 7, thus splitting the data into four sub-images.

Especially when the sub-images comply with a common standard, for example the European 625-line standards or the corresponding Japanese or American 525-line standards, numerous economical standard devices are available for further processing, transmitting, and storing these sub-images.

In the embodiment illustrated in FIG. 1, the images can be separated into four sub-images, which is useful, for example, for processing HDTV images at a resolution of 1:152 visible lines having 1440 pixels each, because the sub-images therefore correspond exactly to the TV standard with 720×576 pixels. However, separating the images into four sub-images is also useful for high-resolution computer graphics having, for example, 1600×1200 pixels, because the super-VGA standard with 800×600 pixels thus applies to the sub-images. In principle, however, the method is not limited to a division into four sub-images, but rather any number of sub-images can be used.

The data for the upper left (UL), upper right (UR), lower right (LR) and lower left (LL) partial or sub-image is then provided via four outputs 9 of separator stage 1.

In data processing stage 5, the above-mentioned data for the four partial images can then be further processed on four channels 11 and recombined via the essentially four inputs 13 of combiner stage 3 into an overall image, which is then provided at system output 14.

As mentioned above, currently known standard units which are available at reasonable prices and can process, buffer, etc. smaller volumes of data per image comparatively quickly, with a high degree of quality, are used for processing the data on four channels 11 of data processing stage 5, namely for processing the four sub-images.

The specific layout of separator stage 1 is explained in greater detail below with reference to FIG. 2. In the block diagram of separator stage 1 illustrated in FIG. 2, HDTV images are separated into four sub-images.

It is possible to switch between an RGB and YUV representation for an analog HDTV input signal. Digital HDTV signals can also be processed. A multiplexer MUX 15 is used to switch between the RGB and YUV representations, with the data signals coming from RGB inputs 7 being converted by a matrix 17 to an internal YUV representation with a 4:2:2 format.

The signals thus obtained and corresponding to the image data are then filtered in an analog low pass 19a to 19c, where the cutoff frequency is 27 MHz for the Y signal and 13.5 MHz for the U and V signals.

The three analog signals having a sampling rate of 108 MHz are then digitized at a sampling rate of 108 MHz in three analog-digital converters, namely the three A/D converter stages 21a through 21c (dual overscan).

Following digitization, the Y channel is delayed one clock cycle. To do this, the delay is set by suitably coordinating the passive components (time-delay circuit 22) so that it amounts to 9.26 ns for the Y signal (corresponding to a 108 MHz clock rate cycle) and 18.52 ns—i.e., exactly twice the amount—for the U and V signals. This makes it possible to provide a simple and high-quality digital compensation. In a clock reducing stage 23a and 23b, the clock rate for the U and V data is cut in half, i.e., reduced from 108 MHz to 54 MHz.

The left and right halves of the image lines, i.e., the Y data, are distributed to two memories, or two FIFOs 25a and 25b, for further processing, using a line data distributor 27.

The pixel rate of the left and right image data must now be reduced to 27 MHz by half-band filters, such as half-band filters 29a and 29b (e.g., using FIR filters with programmable coefficients). Because high quality standards require overscanning, the pixel rate on the Y channel is too high for half-band filtering prior to being separated into half lines; therefore, this can take place only after the data is separated into half lines. At the edges of the filtered areas, however, the pulse response of the HB filter produces a transient response, which would result in the formation of the artifacts mentioned above in the middle of the lines after the half lines are combined, unless further action is taken. This has an unpleasant effect, particularly in the case of homogeneous scenes and in selected test images as shown in ((FIGS. 3a and 3b).

According to the present invention, these disturbances are eliminated by also storing locally in FIFOs 25 an overlap zone 31 extending beyond the length of half lines 30 in the image to be separated so that they are also filtered. This means that the line data, for example the data for a (upper or lower) left half image 30a and for a (upper or lower) right half image 30b, is stored twice in overlap zone 31, namely FIFOs 25a belonging to the left partial image memory and FIFOs 25b belonging to the right partial image memory. Data disturbances 26 produced by the transient response of the HB filter and producing artifacts are shifted by these arrangements into areas, outside the half-line data, which are no longer needed for further processing.

During subsequent further processing or transmission, this overlapping data can be truncated so that no redundant information remains.

FIGS. 3a and 3b show a schematic representation of this process. If the lines are divided exactly in the middle, as shown in FIG. 3a, i.e., corresponding to the data on one line of an image to be separated (breaking the lines down into 720 pixels each in the case of HDTV images), artifacts 26, which are produced by the transient response of the HB filter and are represented as glitches in the lower portion of FIG. 3a, appear in the middle of the line.

If, however, we allow the overlap zone to extend beyond the middle of the line in the direction of the other half-line data of the other half line, the disturbances in the form of artifacts 26 produced by the transient response of the HB filter are shifted into a non-critical area outside the half line, a data area which is no longer needed for later reconstruction of the image in combiner stage 3.

Because the 4:2:2 signal component processing method is used, the pixel rate of the U and V channels can be reduced to 54 MHz in clock-reducing stages 23a and 23b mentioned above before being separated into the left and right half lines in half-band filters 25c and 25b.

Therefore, the half-band filtering step can also take place before separating the image into an upper and lower partial image because the pixel rate is already low enough.

After separating the Y data into half lines in line data distributor 27, corresponding U and V pixels are combined in a multiplexer stage 39 after they have passed through assigned half-band filters 29c and 29d, thus forming a common UV data stream having the same pixel rate as the Y data stream.

In a further, subsequent multiplexer stage 40, the common UV data stream is buffered in two buffers 25c and 25d for the left half-image line data and the right half-image line data.

In the next step, the half-line image data is separated into half-line image data for the upper and lower halves of the image by multiplexing the Y and UV data streams. To do this, a multiplexer stage 43a is provided which is used to split the Y data of the left partial image stored in buffers 45a and 45b into an upper left and lower left partial image. Correspondingly, a further multiplexer stage 43b is provided downstream from half-image filter 29b via which the right partial-image data is provided to buffers 45c and 45d and the right partial-image data is buffered in a buffer for the upper right and lower right partial-image data.

Correspondingly, in buffers 47a through 47d, multiplexers 43c and 43d also buffer the UV data streams in buffers for the upper left and lower left as well as the upper right and lower right partial-image data. Buffers 45a to 47d mentioned above are preferably composed of FIFOs. This buffer allows the image information to be read out asynchronously relative to the input signal, which also provides an image rate conversion function.

The original HDTV image is thus separated into four equal quadrants which correspond to standard video images.

FIFOs 45a to 47d are read out simultaneously and the corresponding Y, U, and V data are converted to four digital data streams (according to D1 standard DSC270 in this example) in conversion stages 49a to 49d. Other high-resolution video standards can also be processed in much the same way. However, the above-mentioned sampling rates must be adjusted.

Figure 2:
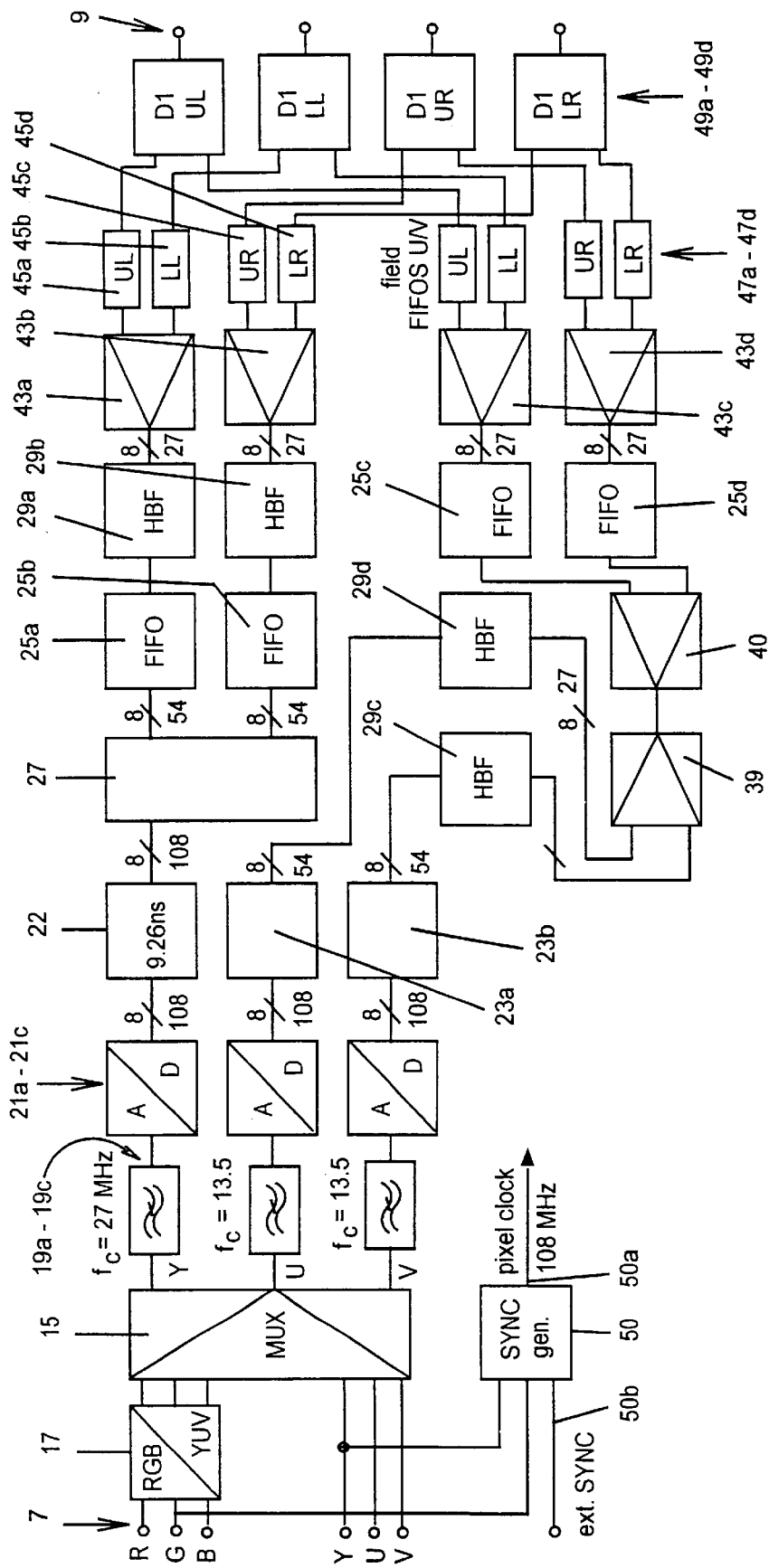
FIG. 2 shows a block diagram of a separator stage according to the present invention.

Outputs 9 illustrated in FIG. 2 then follow the inputs of data processing stage 5 for standard processing of the four sub-images shown in FIG. 1.

Complete separator stage 9 is controlled by a sync generator 50, which has a pixel clock output 50a. It is also possible to switch from internal to external synchronization, for which purpose a generator lock facility with an external reference input 50b is provided. The separator input is thus synchronous with the video input signal, while the output can be synchronized with any external reference. In addition to the external synchronization capability, this technique also provides an image rate conversion function.

Figure 4:
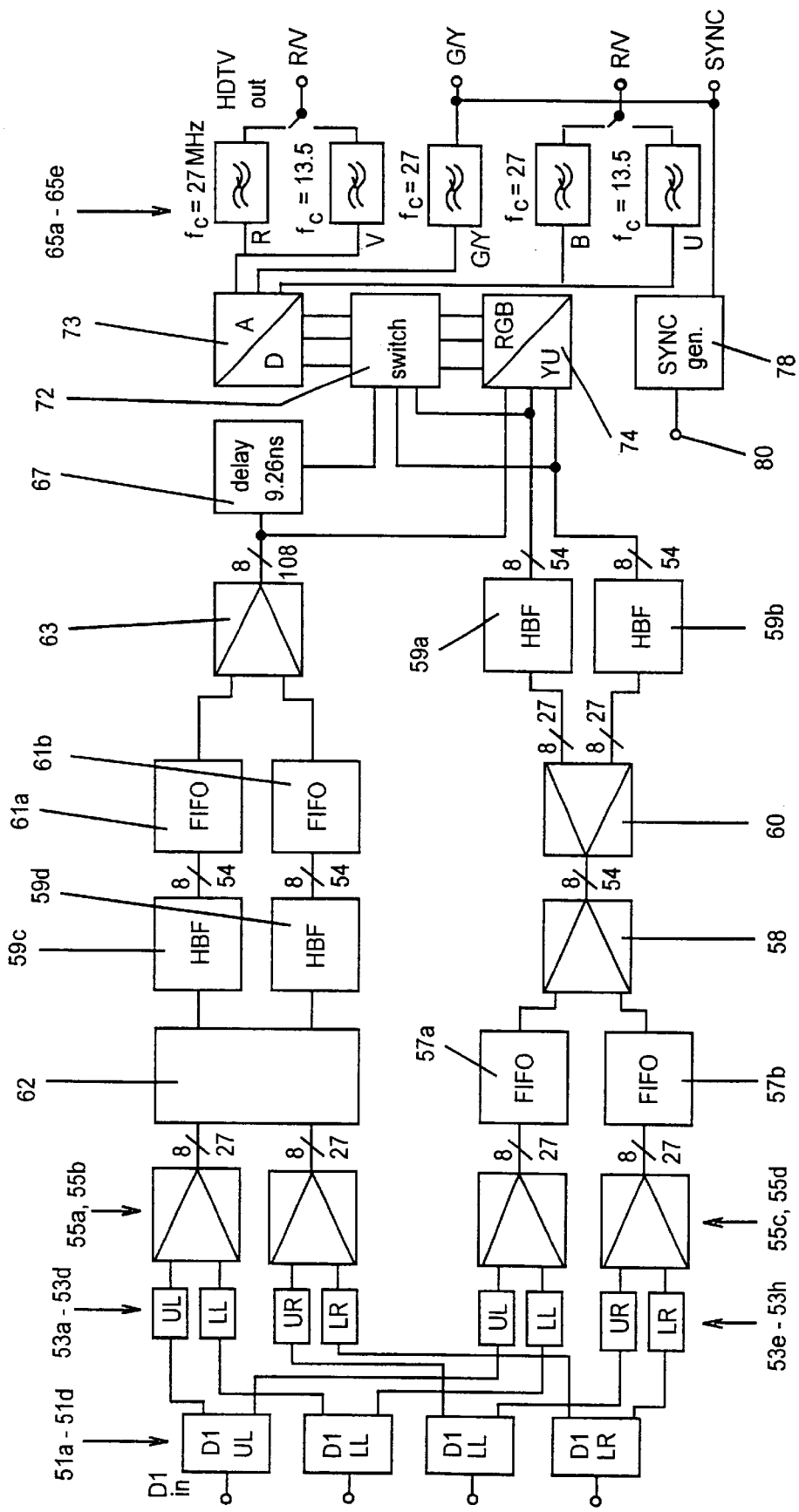
FIG. 4 shows a block diagram of a combiner stage according to the present invention.

The description provided below, with reference to FIG. 4, shows an exemplary block diagram of combiner stage 3.

In the first step, the four serial digital data streams are simultaneously converted to 8 parallel bits, using conversion stages 51a to 51d, and subsequently transmitted to four FIFO banks 53a to 53d for the Y signal and 53e to 53h for the UV signal.

Because the FIFOs can be output asynchronously only to support external synchronization and image rate conversion, differences in the timing of the four channels can be equalized. The upper and lower image halves are then recombined from the four data streams for the Y and UV channels using multiplexers, with multiplexers MUX 55a to 55d in FIG. 4 being provided for this purpose.

The UV information is then processed so that the right and left half lines of the upper and lower partial-image data streams are combined by multiplexers 55c, 55d, shown and the UV data for the left half image thus combined is buffered in a buffer 57a and 57b for the left and right half-image data. A subsequent multiplexer stage 58 can then recombine this half-line image data for the left and right half images and provide it to half-band filters HBF 59a and 59b via another subsequent multiplexer stage 60. The U and V channels are converted separately to 54 MHz using above-mentioned half-band filters 59a and 59b.

Because the clock rate on the Y channel is double the rate on the U and V channels, half-band filtering on the Y channel must take place prior to recombining the left and right half lines. Provided for this purpose are half-band filters 59c and 59d, which are connected upstream from a line data distributor 62 on whose input side are connected the two outputs of upstream multiplexer stage 55a and 55b.

As with the separator, the half lines in this case must be filtered with some overlap in line data distributor 62, thus shifting the disturbances in the areas beyond the middle of the lines, i.e., outside the last half-line data stream needed. The adjacent portion of the corresponding image line of the horizontally adjacent partial image is used to provide the overlap zone. Only afterwards are the two half lines written to a buffer bank 61a and 61b (FIFO banks) for the left and right half lines and subsequently recombined into full HDTV lines with 1440 pixels, using a left-to-right MUX 63, i.e., a multiplexer stage.

Either RGB or YUV outputs are available as the outputs. The bandwidth of the R, G, and B signals are limited by identical analog low pass filters 65a to 65e.

The RGB and YUV signals are converted back and forth using a circuit 72 to which the YUV signals can be supplied in the form of RGB signals either directly or via a matrix 74.

In terms of the luminance and chrominance channels, the luminance channel is delayed by a 9.26-ns cycle dust like in the separator described above), while the chrominance channels are delayed by precisely twice this amount, i.e., 18.52 ns, with a digital time-delay stage 67 combined with filters 65a to 65e being provided for this purpose. Like in the separator, this achieves a simple and high-quality means to compensate for the difference between the luminance and chrominance delays. To adapt this to different system delays, the combiner provides the ability to shift the images several pixels to the left or right in a horizontal direction. A polynomial counter is used for control.

The image data is then converted in a digital-analog converter 73. The analog output data is then supplied to above-mentioned analog low pass filters 65a to 65e in RGB format or in YUV format.

It is also possible to switch from internal to external synchronization, with a generator lock facility 78 having an external HD reference input 80 being provided for this purpose.

The description of the device according to the present invention provided above is based on the example of HDTV video images. However, other high-resolution video standards can be processed in much the same way. To do this, the above-mentioned frequencies and storage formats should be adapted.

It is also readily possible to split the images into more than four channels by distributing the data to additional channels.

What is claimed is:

1. A device, comprising:
    an arrangement including at least one of a separator stage separating a data captured image into partial images and a combiner stage recombining the partial images into a resultant image, at least one of the separator stage and the combiner stage including partial-data buffers buffering partial-image data of the partial images, the partial-image data including redundantly buffered information for at least one particular image of the partial images which is adjacent to another one of the partial images,
    wherein the arrangement filters the partial-image data to generate artifacts, and
    wherein, if the arrangement includes the combiner stage of the at least one of the separator stage and the combiner stage then when the combiner stage recombines the partial images into the resultant image using at least one data portion of the partial-image data, the artifacts are provided outside of areas of at least one image of the partial image which corresponds to the at least one data portion.

2. The device according to claim 1, wherein the arrangement redundantly processes the at least one data portion into the at least one particular image and into a further image of the partial images which is adjacent to at least one particular image, the at least one data portion being provided in an overlap zone.

3. The device according to claim 2, wherein the further image is buffered.

4. The device according to claim 1, wherein the separator stage includes a line data distributor for generating data streams corresponding to at least two adjacent images of the partial images using one image data line.

5. The device according to claim 4, wherein line data of the at least two adjacent images overlap in an overlap zone.

6. The device according to claim 1, wherein the separator stage includes a line data distributor and buffer banks which are provided downstream from the line data distributor, and wherein a number of the buffer banks depends on one half of a number of the partial images.

7. The device according to claim 6, wherein the separator stage includes filter stages which are provided downstream from the buffer banks, the filter stages splitting line data of the data captured image into the partial images.

8. The device according to claim 7, wherein the filter stages include particular stages which reduce a pixel rate of a Y data stream of the data captured image, and wherein the particular stages are assigned to the partial-image data in the separator stage.

9. The device according to claim 8, wherein the particular stages reduce the pixel rate by one half.

10. The device according to claim 8, wherein the filter stages include further stages, the further stages receiving UV data streams of the data captured image before the arrangement generates streams of the partial-image data.

11. The device according to claim 1, wherein the arrangement performs an overscan function to improve a quality of the resultant image.

12. The device according to claim 1, wherein the arrangement shifts a partial area of at least one of the partial images closer to an image data disturbance by a filtering procedure, and wherein, when the combiner stage recombines the partial images into the resultant image, the arrangement one of suppresses and eliminates particular data in the partial area, the particular data being data which is redundantly stored in an overlap zone.

13. The device according to claim 8, wherein the combiner stage includes further filter stages which have further particular stages, the further particular stages increasing the pixel rate, and wherein the further particular stages are assigned to the partial images.

14. The device according to claim 13, wherein the further particular stages double the pixel rate.

15. The device according to claim 1, wherein the arrangement includes a line data distributor stage and half-band filter stages which follow the line data distributor stage, and wherein the arrangement provides a Y data stream of at least one of the partial images downstream from the half-band filter stages.

16. The device according to claim 1, wherein, when the arrangement utilizes a YUV (4:2:2) image data processing step to provide band-limiting filtering, and wherein the arrangement is capable of setting a delay factor to match a difference between delay times on a Y data processing channel and UV data processing channels to an integer multiple of a clock frequency.

17. The device according to claim 1, wherein at least one of separator stage and the combiner stage includes buffer banks which are asynchronously output in conjunction with one of internal synchronization signals and external synchronization signals.

18. The device according to claim 1, further comprising:
a data processing stage provided between the separator stage and the combiner stage, the data processing stage editing and processing the partial-image data.

* * * * *